Patented Mar. 26, 1929.

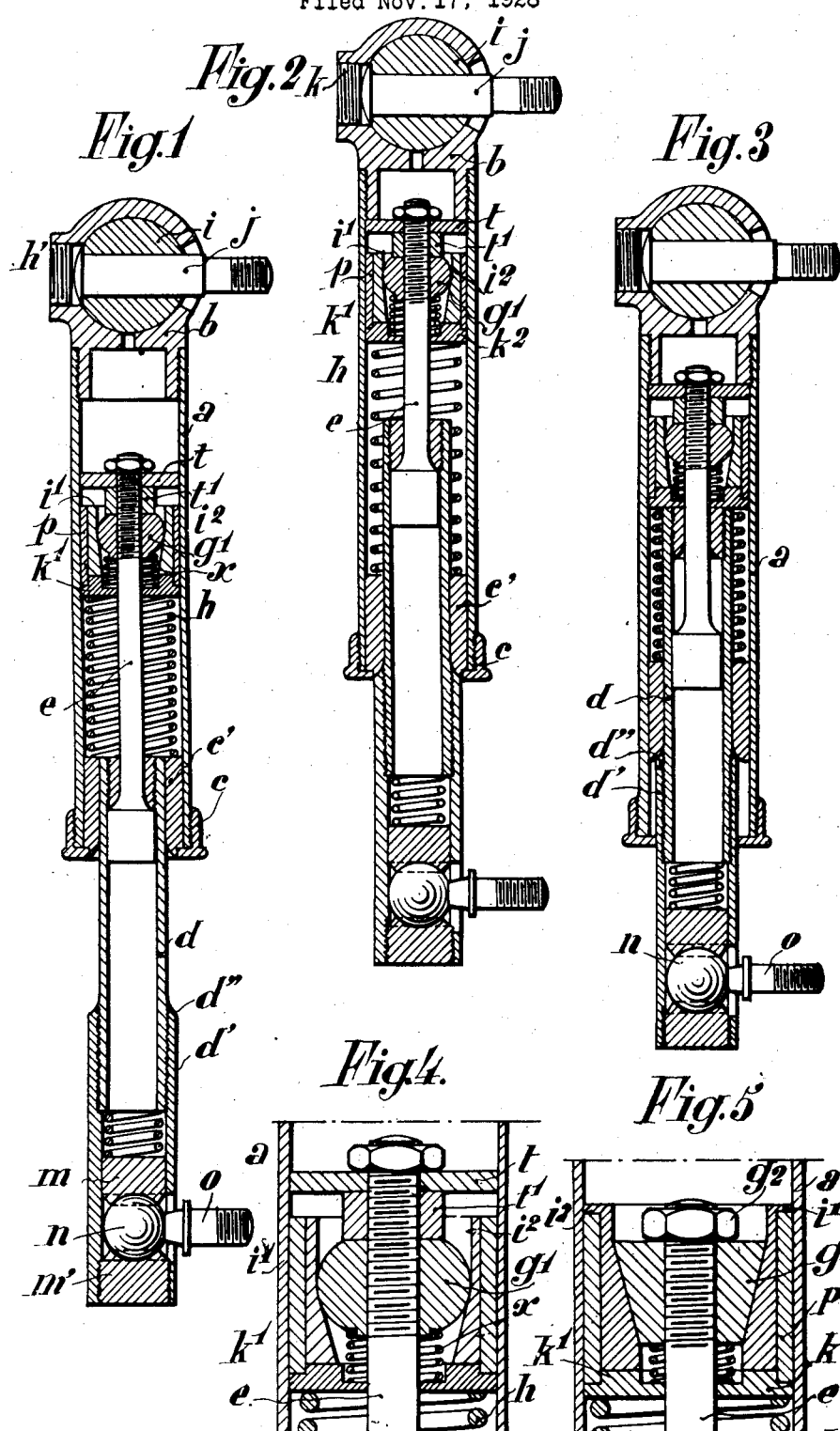

1,706,745

UNITED STATES PATENT OFFICE.

GEORGES PROSPER GUSTAVE RIBIS, OF PARIS, FRANCE.

SHOCK ABSORBER.

Application filed November 17, 1928, Serial No. 320,154, and in France November 12, 1927.

The present invention relates to improvements in shock absorbers of the type described in my co-pending United States patent application filed on the 17th November, 1926, Serial No. 148,974.

The present improvements are mainly characterized in that a single spring is compressed between the fixed socket of the body of the apparatus and the tie rod, the lower tube being provided with a shoulder which can act on the spring for compressing it through the medium of a socket movable in the body of the apparatus, and in that the piston or end of the tie rod movable in the tubular body is combined with a system of brake provided with jaws which are pressed radially against the tubular body, when the elements of the apparatus return to the position of equilibrium after a shock.

The accompanying drawing illustrates, by way of example only, a form of construction of a shock absorber such as above characterized.

Figure 1 is an axial section of the whole of the apparatus, its elements being in position of equilibrium.

Figures 2 and 3 are similar views, with the elements displaced under the action of a shock.

Figure 4 is, on an enlarged scale, an axial section of the brake device placed at the end of the tie rod.

Figure 5 is a view similar to Fig. 4, showing a constructional modification.

The improved apparatus first differentiates from that described and illustrated in the above mentioned co-pending application in that the spring $h$, instead of directly bearing on the socket $c$, secured on the tube $a$, bears thereon through the medium of a free socket $c'$ slidable within the tube or cylinder $a$.

The tube $d$, instead of exactly fitting in the socket $c$, passes into the same with a play at least equal to the thickness of a lining $d'$ secured by screwing or otherwise on the lower part of the tube $d$, so that the annular shoulder $d''$ may, for suitable relative positions of the various parts of the apparatus, bear against the lower face of the movable socket $c'$ (Figs. 1, 2 and 3).

As indicated in the foregoing, the end of the tie rod $e$ is provided with a brake which mainly acts when the elements of the apparatus tend to come back to their positions of equilibrium.

In the example of Fig. 5, this brake has a washer $k^1$ through which the tie rod $e$ freely passes and which bears on the spring $h$. The tie rod is screw threaded and receives a frustum-shaped member $g^1$ screw and immobilized by a nut $g^2$ and which bears on the corresponding conical bearing portions of elements $i^1$ which are independent or obtained by radially slotting a socket of suitable shape. Between the flange $k^2$ of the washer $k^1$ and the flanges $i^2$ of the elements $i^1$ are held friction shoes or a segment, preferably of plastic material, arranged between the annular space comprised between the outer cylindrical faces of the elements $i^1$ and the inner face of the tubular body $a$. A spring $x$ is interposed between the washer $k^2$ and the small faces of the elements $i^1$.

The operation of the improved apparatus is as follows: when the apparatus is in position of equilibrium, the spring $h$ is under tension between the washer $k^2$ of the tie rod, and the fixed socket $c$, on which it bears through the medium of the socket $c'$ (Fig. 1). When a shock moves the axle towards the chassis, the same operation occurs as that set forth in the above mentioned co-pending application.

The spring $h$ relaxes and, if the shock is of sufficient importance, the flanges $i^2$ bear on the bottom of the cylinder $a$ and the tube $d$ freely moves along the tie rod $e$ and internally to the socket $c'$ (Fig. 2). When the lining $d'$ bears on the socket $c'$, the spring $h$ is compressed (Fig. 3) and acts in the same way as the spring $h'$ of the above mentioned co-pending application.

But, when the return of the elements of the apparatus to their positions of equilibrium takes place, the frustum-shaped member acts for spacing apart the parts $g^1$ and pressing the shoes $p$ against the tubular body, this causing a friction so much the more intense as the elements of the apparatus are more violently urged towards their positions of equilibrium. Owing to this arrangement, the chassis, cannot receive an oscillatory movement relatively to the axles.

The spring has for object to release the frustum-shaped member and the elements when the tie rod $e$ rises in the tubular body $a$.

In the example of construction of Figs. 1, 2, 3 and 4, the frustum-shaped member of the brake is replaced by the member $g^1$ in the shape of a revolution body having a curved generating line which comes in contact with the conical bearing portions of the elements $i^1$ only by lines. This member $g^1$ bears against a washer or flange $t$, through the medium of a stay member $i^1$, the washer $t$ being held on the tie rod $e$ by a nut. A spring $x$ is interposed between the member and the washer $k^2$ and has the same function as in the example of construction of Fig. 5. The operation is identical with that which has just been described.

It is obvious that the devices which have just been described can be subjected to constructional modifications without altering the principle of the operation and the object sought for, and without, consequently, departing from the scope of the invention. Thus, the material which constitutes the segment or the brake shoes can be either a plastic material, as already described, or a resiliently distortable material the prototype of which is rubber, or again a friction material undistortable for the stresses to which it is subjected. Likewise, the brake segments or shoes may be either multiple in number or reduced to a single one without modifying the invention.

What I claim as my invention and desire to secure by Letters Patent is:—

A shock absorber of the character described, including telescoping tubular members having their remote ends fixed to parts to be supported, a fixed socket on the outer of said members, a movable socket within the outer of said members retained by the fixed socket and forming a guide for the inner tubular member, a shoulder on the inner tubular member for coacting with the movable socket, a tie rod mounted within the outer tubular member and having a piston head in limited sliding engagement with the inner tubular member, a main spring about the tie rod having one end bearing against the movable socket, and a braking device mounted on the opposite end of the tie rod and bearing against the opposite end of the spring and having radially movable elements engageable with the inner surface of the outer tubular member, substantially as and for the purposes set forth.

In testimony whereof I have signed my name to this specification.

GEORGES PROSPER GUSTAVE RIBIS.